Patented May 3, 1949

2,469,295

UNITED STATES PATENT OFFICE 2,469,295

SYNTHETIC RESINS AND METHOD FOR PRODUCING SAME

Richard L. Meier and William E. Elwell, Berkeley, Calif., assignors to California Research Corporation, San Francisco, Calif., a corporation of Delaware No Drawing. Application April 3, 1945,
Serial No. 586,442

7 Claims. (Cl. 260—66)

The present invention relates to new compositions of matter and more particularly to copolymers of vinyl and the like ketones with vinyl pyridines.

It is an object of the present invention to provide new and valuable resinous copolymers containing ketone groups and basic nitrogen groups in the same molecule. A more particular object of the invention is to provide new and improved thermoplastic resinous copolymers containing ketone groups and amine groups.

A further object of the invention is to provide resinous copolymers soluble in "aqueous acids." The term "aqueous acids," as used in this specification, refers to dilute solutions of water soluble acids.

A still further object of the invention is to provide such resinous copolymers suitable for use as acid adsorbents, ion exchange resins, detergents, dyestuff intermediates, etc. Other objects of the invention will be apparent from the description given hereinafter.

The aforementioned objects of the invention are accomplished by copolymerizing a monomer of a vinyl ketone with a monomer of a vinyl pyridine.

As initial materials for the production of copolymers of the present invention, methyl isopropenyl ketone and the like, and monomeric vinyl ketones, such as methyl vinyl ketone, ethyl vinyl ketone, propyl vinyl ketone, butyl vinyl ketone, isobutyl vinyl ketone, may be used. Monomeric vinyl pyridines, preferably 2-vinyl pyridine, may be used as initial materials for the second constituent of copolymers of this invention.

The invention is illustrated, but not limited, by the following examples:

*Example 1*.—5 cc. of methyl vinyl ketone and 10 cc. of 2-vinyl pyridine are placed into a sealed glass tube in the presence of 1% by weight of benzoyl peroxide and heated in a steam bath at 100° C. for 42 hours. The resulting product is a reddish-brown, brittle, thermoplastic solid. It is dissolved in chloroform, and the solution poured into isopentane, causing the formation of a precipitate. This precipitate is treated repeatedly with chloroform and isopentane as described above. The final precipitate is a solid thermoplastic resin of a considerably lighter color than the original product and is soluble in dilute acids such as hydrochloric, sulfuric, nitric, etc.

*Example 2*.—5 g. of methyl vinyl ketone and 15 g. of 2-vinyl pyridine are subjected to copolymerization by exposing their mixture to the action of ultra-violet light for 100 hours. The resulting product consists of dark reddish-brown, viscous oil. It is subjected to the same treatment with chloroform and isopentane as described in Example 1, and the final precipitate is a similar light-colored, solid, thermoplastic resin.

*Example 3*.—10 cc. of methyl isopropenyl ketone and 10 cc. of 2-vinyl pyridine are placed into a sealed glass tube in the presence of 1% by weight of benzoyl peroxide and heated in a steam bath at 100° C. for 20 hours. The resulting product is a dark, extremely viscous liquid. It may be subjected to the treatment with chloroform and isopentane, as described in Example 1, in order to obtain final products of a lighter color, which are solid when dry, and are readily soluble in dilute aqueous acids.

Polymers of pure methyl vinyl ketone and those of pure 2-vinyl pyridine are known to dissolve in chloroform. On the other hand, the same two polymers are insoluble in isopentane. It is also known that polymers of pure methyl vinyl ketone are affected by dilute acids which cause a rapid reddening of said polymers and and an eventual resinification, especially when warm, leading to a brown-black, insoluble material. In contrast thereto, polymers of pure 2-vinyl pyridine dissolve in dilute acids and are not so affected. Therefore, the solubility of the final precipitate in dilute acids, observed in the above examples, was a proof that the products were copolymers, and not a physical mixture of homopolymers.

Furthermore, when a polymer of pure vinyl pyridine alone is produced, the nitrogen analysis of this polymer yields a value of about 13% of nitrogen with reference to the weight of the polymer. The nitrogen analysis of the final product in the above examples gives values which are considerably lower, and thus provides an additional proof that this product is a copolymer of methyl vinyl ketone and 2-vinyl pyridine. Moreover, the product of the above examples is homogeneous and readily dissolves in acetone, whereas pure vinyl pyridine polymer is not as readily dissolved in acetone.

The conditions of copolymerization are subject to variation in accordance with the requirements of each particular case. Thus the copolymerization may be effected by irradiation with ultraviolet light or by heating the mixture of monomers with or without using pressure. However, it is generally preferred to use peroxide catalysts, such as benzoyl peroxide, for the copolymerization, although other suitable and effective catalysts may be used. The process of copolymerization is preferably carried out at a temperature above the room temperature and may vary from 40 to 150° C. according to the requirements of each case. Likewise, the relative amounts of vinyl pyridine in the copolymer may vary in accordance with the intended use: if the copolymer is to be used as an ion exchange resin, the amount of vinyl pyridine may be as high as 75% of the mixture of ketone and vinyl pyridine monomers (as in Example 2); on the other hand, if it is desired merely to protect the ketone constituent from the effect of acidic materials and to facilitate the dissolution of the copolymer in dilute acids, the amount of vinyl pyridine may be as low as 5% of the ketone monomer.

Methyl vinyl ketone polymers exposed to the action of acidic materials, e. g., traces of HCl gas, become dark in color and their thermoplasticity decreases. When vinyl pyridine constituents are introduced into the molecule, i. e., when methyl vinyl ketone is copolymerized with vinyl pyridine in accordance with the present invention, a product is obtained which does not darken and suffer an impairment of thermoplasticity and tensile strength upon exposure to the effect of acidic materials, such as traces of HCl gas.

A particularly valuable characteristic of the copolymers of the present invention is their solubility in aqueous acids and their remarkably high capacity for adsorption of acids or combination with hydrogen ions.

This characteristic affinity for aqueous acids renders the copolymers of the present invention highly useful as ion exchange resins or acid adsorbents in the recovery of valuable acidic constituents from industrial waste solutions and the like. Of course, a number of factors affect the acid-binding capacities of acid adsorbents, viz., degree of ionization of the acid to be recovered, basicity of the adsorbent, influent concentration of the aqueous acid, solubility of the resin in the solvent containing the acid to be adsorbed, etc. These factors, however, may be controlled by adapting the composition of the copolymers to the particular use, e. g., by reducing the solubility of the resinous copolymer in water, namely, by effecting controlled cross-linking between the polymer chains of the copolymer molecule, by incorporating larger quantities of vinyl pyridine monomer, by altering the length or the molecular weight of the copolymer, etc., without departing from the scope and the spirit of the invention. The copolymers prepared in accordance with the procedure described in the above examples are soluble in acetone, chloroform, ethylene dichloride, and slightly soluble in benzene. They are capillary-active and possess valuable dispersive properties when in solution. If desired, their plasticity may be enhanced by increasing the molecular weight of the ketone constituent, e. g., by substituting a higher alkyl vinyl ketone for a part or all of the methyl vinyl ketone in the above examples.

Since many widely different embodiments of this invention may be made without departing from the scope thereof, it is to be understood that this invention is not limited to the specific embodiments thereof except as defined in the claims.

We claim:

1. A viscous liquid to normally solid resinous copolymer of monomers consisting of vinyl pyridine in which the vinyl group is directly attached to a carbon atom of the pyridine ring and a ketone selected from the group consisting of methyl, ethyl, propyl, butyl and isobutyl vinyl ketones and methyl isopropenyl ketone, said vinyl pyridine being present in an amount of from 5% by weight based on said ketone to 75% by weight based on the mixture of ketone and vinyl pyridine.

2. A copolymer as defined in claim 1 wherein said ketone is methyl vinyl ketone.

3. A copolymer as defined in claim 1 wherein said ketone is methyl isopropenyl ketone.

4. A copolymer as defined in claim 1 wherein said vinyl pyridine is 2-vinyl pyridine.

5. A process of preparing a viscous liquid to normally solid resins soluble in aqueous acids and containing an amine group capable of adsorbing acid ions, which comprises copolymerizing a mixture of monomers consisting of a vinyl pyridine in which the vinyl group is directly attached to a carbon atom of the pyridine ring with a ketone selected from the group consisting of methyl, ethyl, propyl, butyl and isobutyl vinyl ketones and methyl isopropenyl ketone, said vinyl pyridine being present in an amount of from 5% by weight based on said ketone to 75% by weight based on the mixture of ketone and vinyl pyridine, said polymerization being effected in the presence of a peroxide catalyst at a temperature of from 40° C. to 150° C.

6. A process as defined in claim 5 wherein said ketone is methyl vinyl ketone.

7. A process as defined in claim 5 wherein said vinyl pyridine is 2-vinyl pyridine.

RICHARD L. MEIER.
WILLIAM E. ELWELL.

REFERENCES CITED

The following references are of record in the file of this patent:

UNITED STATES PATENTS

| Number | Name | Date |
|---|---|---|
| 2,416,440 | Fryling | Feb. 25, 1947 |

FOREIGN PATENTS

| Number | Country | Date |
|---|---|---|
| 163,775 | Sweden | Nov. 1, 1933 |
| 849,126 | France | Aug. 7, 1939 |